(12) United States Patent
Patel et al.

(10) Patent No.: US 9,275,074 B1
(45) Date of Patent: Mar. 1, 2016

(54) SYSTEMS AND METHODS FOR CONTENT PLACEMENT, RETRIEVAL AND MANAGEMENT BASED ON GEOLOCATION AND OTHER PARAMETERS

(71) Applicant: Tip Vyspots, LLC Vy, Chicago, IL (US)

(72) Inventors: Roopit Patel, Chicago, IL (US); Matthew Karazin, Chicago, IL (US)

(73) Assignee: Tip Vyspots, LLC Vy, Chicago, IL (US)

( * ) Notice: Subject to any disclaimer, the term of this patent is extended or adjusted under 35 U.S.C. 154(b) by 0 days.

(21) Appl. No.: 14/812,724

(22) Filed: Jul. 29, 2015

Related U.S. Application Data

(60) Provisional application No. 62/059,560, filed on Oct. 3, 2014.

(51) Int. Cl.
*G06F 17/30* (2006.01)

(52) U.S. Cl.
CPC .... *G06F 17/30241* (2013.01); *G06F 17/30082* (2013.01)

(58) Field of Classification Search
CPC .................................................. G06F 17/30082
USPC ........................................................... 707/781
See application file for complete search history.

(56) References Cited

U.S. PATENT DOCUMENTS

| | | | |
|---|---|---|---|
| 6,650,902 B1 | 11/2003 | Richton | |
| 6,687,608 B2 | 2/2004 | Sugimoto et al. | |
| 7,082,365 B2 | 7/2006 | Sheha et al. | |
| 7,813,741 B2 | 10/2010 | Hendrey et al. | |
| 7,848,765 B2 | 12/2010 | Phillips et al. | |
| 8,060,389 B2 * | 11/2011 | Johnson | G06F 17/3087 705/6 |
| 8,073,461 B2 | 12/2011 | Altman et al. | |
| 8,438,294 B2 | 5/2013 | Lampell et al. | |
| 8,762,302 B1 * | 6/2014 | Spivack | G06N 5/046 706/12 |
| 8,903,426 B2 | 12/2014 | Tholkes et al. | |
| 2008/0086368 A1 | 4/2008 | Bauman et al. | |
| 2009/0222438 A1 * | 9/2009 | Strandell | G06F 17/3087 |
| 2011/0035284 A1 | 2/2011 | Moshfeghi | |
| 2012/0278164 A1 * | 11/2012 | Spivack | G06Q 10/10 705/14.52 |
| 2013/0110631 A1 * | 5/2013 | Mitchell | H04W 4/185 705/14.58 |
| 2013/0179544 A1 * | 7/2013 | Sainnsbury | H04L 67/34 709/219 |
| 2013/0185355 A1 * | 7/2013 | Tseng | H04L 65/403 709/204 |
| 2013/0239192 A1 * | 9/2013 | Linga | G06F 21/44 726/7 |
| 2013/0303189 A1 * | 11/2013 | Bennett | H04W 4/02 455/456.2 |
| 2014/0129553 A1 | 5/2014 | Sankar | |
| 2015/0142680 A1 * | 5/2015 | Baldassano | G06Q 30/018 705/317 |
| 2015/0148071 A1 | 5/2015 | Elmore et al. | |

* cited by examiner

*Primary Examiner* — Noosha Arjomandi
(74) *Attorney, Agent, or Firm* — Scherrer Patent & Trademark Law, P.C.; Stephen T. Scherrer; Monique A. Morneault

(57) ABSTRACT

The present invention is in the technical field of geolocation. More particularly, the present invention is in the technical field of making content in the form of electronic data available for retrieval when a device has satisfied the Retrieval Range and other Rules which govern the ability to retrieve the content. Retrieval of Content by user devices may be based on Rules communicated by an App, Admin or third party interface and shall be contained and processed by an application interface engine.

30 Claims, 22 Drawing Sheets

SYSTEMS AND METHODS FOR CONTENT PLACEMENT, RETRIEVAL AND MANAGEMENT BASED ON GEOLOCATION AND OTHER PARAMETERS

The present invention claims priority to U.S. Provisional Pat. App. No. 62/059,560 titled, "Geo Located Content Placement, Retrieval and Management," filed Oct. 3, 2014, the content of which is hereby incorporated by reference in its entirety.

TECHNICAL FIELD

The present invention is in the technical field of geolocation. More particularly, the present invention is in the technical field of making Content in the form of electronic data (hence forth "Content") available for Retrieval when respective Retrieval has satisfied the Retrieval Range and within the criteria of Rules which govern the ability to Retrieve the Content. Retrieval of Content by User Devices may be based on Rules communicated by App, Admin or third party interface and shall be contained and processed by an APIE (defined herein).

BACKGROUND

As portable internet-connected devices, such as mobile phones, tablets, and laptops (aka User Devices), continue to evolve to provide Content to users, the opportunity to share and distribute Content increases. In one situation, Content can be Placed and its Retrieval controlled by explicitly determining the recipients, perhaps by email address, account identifier or by another unique identifier, and transmitted directly to the User Device. In another situation, Content can be Placed and its Retrieval controlled by specifying an access code which only valid recipients know. Typically, the User Device placing the Content has distributed this access code manually or through an electronic communication to the intended recipient(s). In another example, the User Device placing the Content leaves the Content open to all users for Retrieval, with other Rules or no Rules applied.

A need exists for Content to be Retrievable based on location. Specifically, a need exists for system and methods that allow for the Retrieval of digital content based on a user's physical Geolocation.

Moreover, a need exists for Content to be Placed by a user so as to be accessible by others when others are at or near the location of the Placed Content. Specifically, a need exists for Content to be Placed and for Retrieval Rules to be associated with the Placed Content.

Moreover, a need exists for Content to be Retrievable when a user is within a pre-defined range of the Geolocation of the Content. More specifically, a need exists for systems and methods that allow users to Retrieve Content when within the pre-defined range of the Geolocation of the Content, and that otherwise satisfies one or more other Rules for Retrieval.

SUMMARY

The present invention is a technology allowing the Placement and Retrieval of Content at a specific physical location. Particularly, the present invention is in the technical field of making Content available for User Device Retrieval when Retrieval is requested after satisfying the Geo Place Rules and any other Rules required to Retrieve such Content. Even more particularly, the present invention relates to an APIE for placing Content into a Geo Place and with Retrieval Rules, Retrieving all applicable Content. The APIE is an "engine" and a "platform" that is also for third party applications to use similar to the App through APIs. Content Placement can specify one or more Retrieval Rules for the Content to be Retrieved.

To this end, in an embodiment of the present invention, a system for associating digital content with a physical location is provided.

It is, therefore, an advantage and objective of the present invention to provide systems and methods for allowing Content to be Retrievable based on location.

Specifically, it is an advantage and objective of the present invention to provide system and methods that allow for the Retrieval of digital Content based on a user's physical Geolocation.

Moreover, it is an advantage and objective of the present invention to provide systems and methods that allow Content to be Placed by a user so as to be accessible by others when others are at or near the location of the Placed Content.

Specifically, it is an advantage and objective of the present invention to provide systems and methods that allow Content to be Placed and for Retrieval Rules to be associated with the Placed Content.

Moreover, it is an advantage and objective of the present invention to provide systems and methods that allow Content to be Retrievable when a user is within a pre-defined range of the Geolocation of the Content.

More specifically, it is an advantage and objective of the present invention to provide systems and methods that allow users to Retrieve Content when within the pre-defined range of the Geolocation of the Content, and that otherwise satisfies one or more other Rules for Retrieval.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

Figure 1:
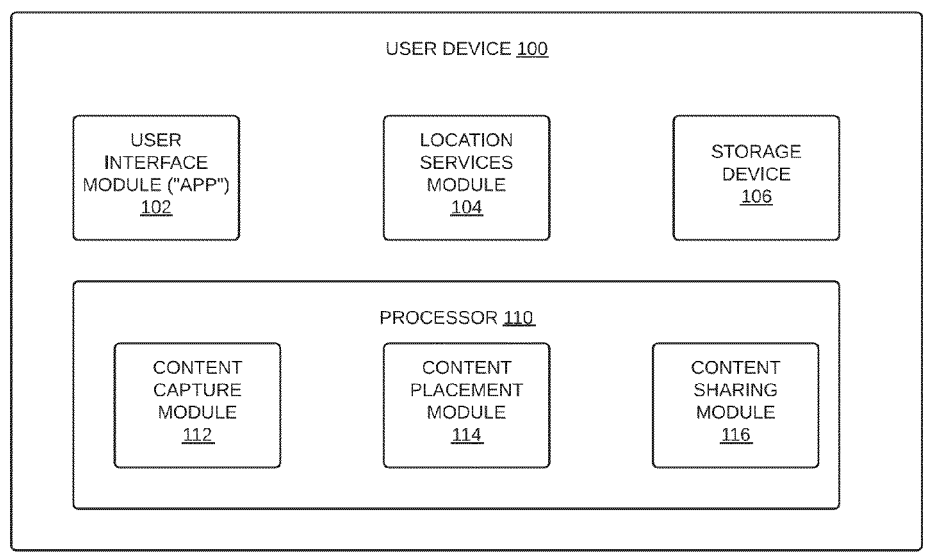
FIG. 1 is a block diagram illustrating one example embodiment of a User Device.

The present invention is a technology allowing the Placement and Retrieval of Content once a User Device has satisfied the Geo Place Rules and any other Rules and parameters required by the APIE. Referring now to the invention in more detail, wherein like numerals refer to like parts. The Content may be Retrievable by a user using a User Device (as defined herein) via an App, via website, via a third party application; or as otherwise apparent to one of ordinary skill in the art.

DEFINITIONS

Application Programming Interface Exchange (APIE): An engine and platform in which the exchange for an Application Programming Interface and electronic software applications communicate and process, which may use computer devices, servers, databases, programs, storages, Apps, Admins and User Devices.

Application (App): The electronic software that is local to a User Device that processes and communicates with the APIE, including third party Apps, whether by program application, program web application, through a website or any network communication system.

Admin: The electronic software that may include the following functions: control, modify, delete, reprocess, process, and communicate, with APIE, as well as other like functions as apparent to one of ordinary skill in the art.

Content: Electronic data aggregated to one or many title(s).

Event: A Geolocation having associated therewith a plurality of Geo Places.

Geolocation: A geographic location or area measured by one of many technologies, such as but not limited to: Global Positioning System (GPS), wireless systems, beacons, location systems, and other like technologies.

Geo Place: Content with a Geolocation as a Rule.

Retrieval: A User Device using Content in any format and in all capacities via an App or a website.

Retrieval Range: The range Rule from a Geo Place or Event in which a User Device may Retrieve Content in respect to the Geolocation of the User Device, such as the physical distance from the location of a Content of which the Content may be Retrieved by a User Device. A Retrieval Range generally does not need to verify if other Rules need to be satisfied.

Retrieval Rules: The set of Rules for Content, which shall be for an Event of Geo Places or a Geo Place, and which, when said Rules for Event, Geo Place and/or Content have been satisfied, Content is Retrieved and/or used by a User Device.

Rules: One or many requirements set on a Geo Place and/or Content, and in which any part or in whole may be satisfied to release Content parts or in whole, for use accordingly.

Unique Identifier (UID): Used by APIE to verify, identify and/or communicate with a user, User Device, App, Content, Geo Place, Geolocation, Event or third party registrations, which can be: unique and random keys, registration codes, encryptions, or other like security measures.

User Device: A mobile device using electronic communication and processing, which can have one or more Apps and/or access one or more websites and can communicate and process with APIE.

DETAILED DESCRIPTION

FIG. 1 is a block diagram illustrating an embodiment of a User Device 100, which could be a mobile phone, tablet, or other computing device. The User Device 100 may be utilized to generate, Place, and Retrieve Content at a Geo Place in conjunction with the APIE 218. The User Device 100 can include a user Interface Module 102, a Location Services Module 104, a Storage Device 106, and a Processor 110.

Figure 2:
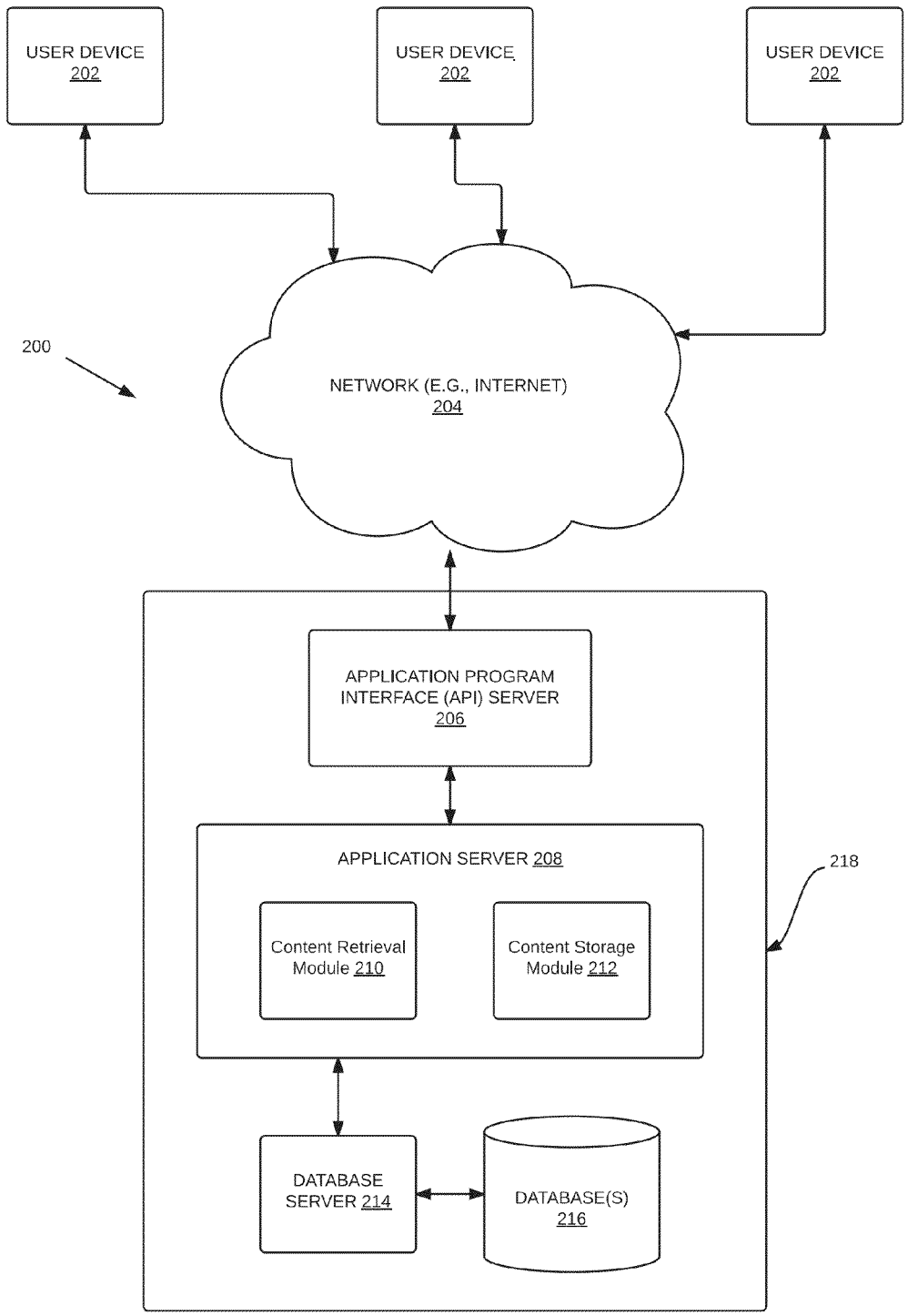
FIG. 2 is a network diagram illustrating one example embodiment of a network system having a client server architecture (i.e. APIE to App or User Device) configured for communicating and exchanging data over a network.

Specifically, the User Device 100 may have a user Interface Module 102 that provides direct access to the APIE 218 (as illustrated in FIG. 2) for Placement and Retrieval of Content. The Location Services Module 104 ascertains the User Device's geographical location, such as, for example, coordinates for associating with Content and for the Retrieval of Content. Multiple sensors and inputs may be utilized to obtain this information such as, for example, GPS, Wi-Fi, sensors, beacons or Bluetooth based sensors.

The Storage Device 106 includes memory that may be used by the Processor 110. The Storage Device 106 stores data utilized by the APIE 218. The Processor 110 is a central processing unit and includes a Content Capture Module 112, a Content Placement Module 114, and a Content Sharing Module 116. The Content Capture Module 112 allows the User Device to capture digital media including but not limited to URL, text, screen captures, pictures, video, and audio. The Content Placement Module 114 allows users to select Geolocations for Content which they may capture using the Content Capture Module 112 or that may already be stored on the Storage Device 106. The Content Sharing Module 116 allows the User Device 100 to share Content Placed at Geolocations with other User Devices 100 and also the use of the APIE 218 under the parameters of said system and Rules if any.

FIG. 2 is a network diagram illustrating a communication system 200 for transmitting data between multiple User Devices 202 and an APIE 218 over a Network 204. This is an example of an embodiment of a communication system in the form of client server architecture. Other example embodiments include network architectures such as distributed network environments and peer-to-peer environments.

The communication system 200 in this example includes an Application Program Interface (API) Server 206 which communicates with an Application Server 208 to Retrieve and store data on a Database 216 through Database Server 214. One such use for a network architecture as described herein is to Place and Retrieve Content or Geo Places and Rules which govern this Retrieval. In such an embodiment, the Content Retrieval Module 210 handles the interface of validating a User Device's 202 geolocation against the Rules of Geo Places. If the User Device 202 satisfies the Rules, then the Geo Place is Retrieved and returned to the User Device 202. In such an embodiment, the Content Storage Module 212 handles the interface of receiving Geo Places and Rules from a User Device 202 and storing the data within a Database 216.

Figure 3:
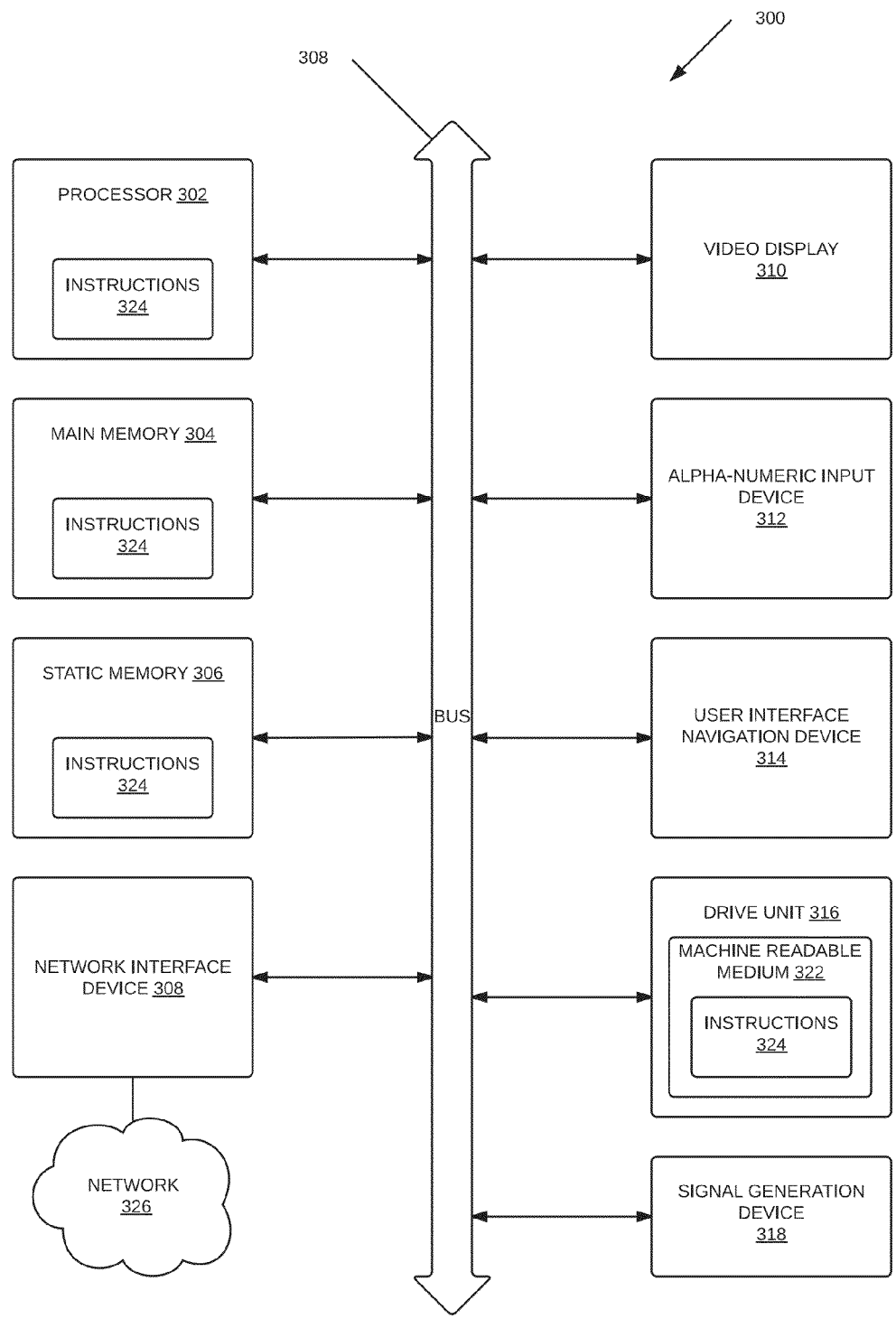
FIG. 3 is a diagrammatic representation of a machine or device in the example form of a computer system within which a set of instructions for causing the machine to perform any one or more of the methodologies discussed herein and which may be executed.

FIG. 3 is a block diagram illustrating an example of a computer system 300 which may be used in some embodiments of the invention. While the computer system 300 illustrates various components of a computer system, it is not intended to represent any particular architecture or manner of executable instructions which cause a processor to perform certain steps. This invention may run on or with computers systems similar to FIG. 3.

Specifically, the computer system 300 may include components typical of computer systems that are known by those of ordinary skill in the art, including a processor 302, main memory 304, static memory 306, a video display 310, an alpha-numeric input device 312, a user interface navigation device 314, a drive unit 316, a signal generation device 318, all of which may be connected to each other through a main bus 308. Instructions 324 may be processed via the processor 302, and stored in one or more of the main memory 304, static memory 306 and/or the machine readable medium 322 on the drive unit 316. The network interface device 308 may be connected to a network 326.

Figure 4:
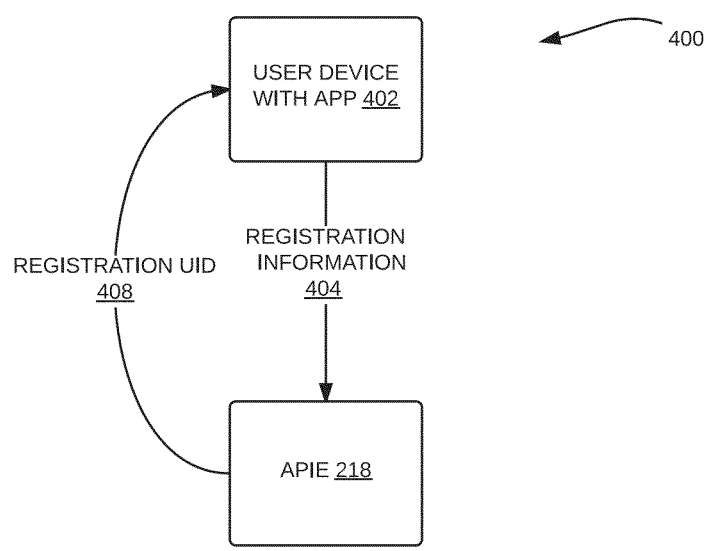
FIG. 4 illustrates a process of registering with the APIE and obtaining credentials and parameters for User Devices and Apps.

FIG. 4 illustrates a general method 400 of the present invention for allowing a User Device 402 access to and registration with the App and APIE 218. Registration is required prior to using the APIE 218 for the purpose of Content Placement and Retrieval. To register, the User Device 402 accesses the App and APIE 218 by sending Registration Information 404 to the APIE 218. Once the requirements of registration are satisfied, the User Device with the App 402 can access the APIE 218 via UID contained within the response message Registration UID 408 to perform additional APIE functions.

Figure 5:
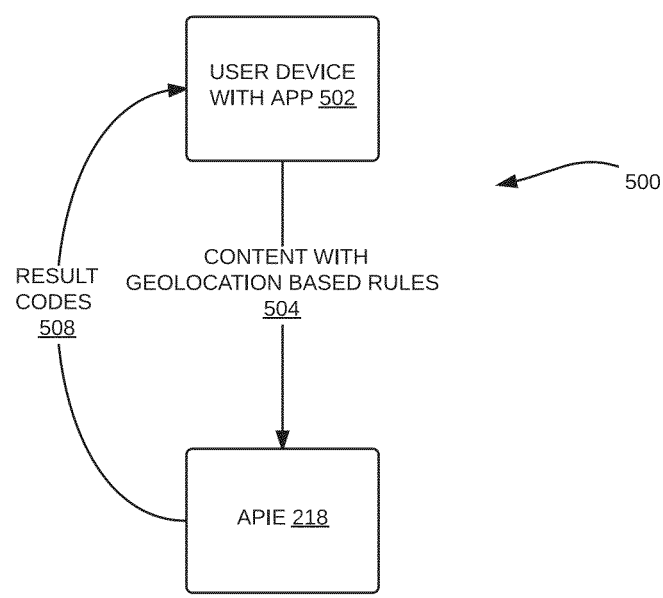
FIG. 5 illustrates a process of placing Content into Geo Place.

FIG. 5. Illustrates a general method 500 of the present invention for allowing a User Device 502 to Place a Content at a Geolocation to create a Geo Place. In this embodiment, the User Device 502 sends the Content with parameters 504 to the APIE 218 for processing. The APIE 218 then returns a series of Result Codes 508 indicating the success or failure of various processing steps.

Each call to the APIE 218 may specify the following parameters, not all which are required:

Registration UID 408—Obtained by registration via the process described in FIG. 4.

Geo Place (e.g., A Content paired with a Geolocation).

Rules—For example here are some of the Rules that may be Placed on Content, each Rule being independent of another, for purposes of Retrieval in full or part:

Available Date—the available date and time that Content may be first Retrieved by a User Device.

Expiration Date—the expiration date and time when Content can no longer be Retrieved by a User Device. An expiration date may not be required.

Privacy—the levels and exceptions for which users, if any, are allowed to Retrieve Content. A Privacy may not be required.

Sharing—Even though sharing is a feature that may not be a Retrieval Rule, sharing can be made to be a Retrieval Rule. The requirement is for a user to share Content with other users, in order to Retrieve Content. A sharing may not be required.

Max Retrieval Quantity—this number specifies the number of total Retrievals by unique User Devices and/or users that Retrieve a specific Content. This number representing the number of times Content may be Retrieved may not be required.

Dynamic Retrieval Threshold—Specifies if the Retrieval threshold can dynamically expand or contract to satisfy Content demands, parameters; or Rules.

As a user Places Content associated with Geolocations, the User may associate further Geo Place conditions and/or meta data as follows. Specifically, further conditions or meta data may include defining an Event (as discussed in more detail below), and/or adding a title and/or a longer description that may provide a contextual overview of the Content Placed. Moreover, the Content may be defined by type or a category that defines the Content, such as being defined as an audio file, a picture file, a video file, a URL with or without page capture, text, or other like types or categories. In addition, the Content may have the ability to be flagged to indicate the identity of the user that Retrieves the Content, or provide a counter showing the number of times the Content has been Retrieved. Other like conditions or meta data may include a text field where information about the Content may be Placed, a file name, such as a field that specifies the location of files that correlate to Content, or a retrieval notification flag that indicates to the user whether the Content is Retrieved. Other like conditions or meta data may be associated with the Content as may be apparent to one of ordinary skill in the art.

According to FIG. 5, the Content Placement call 504 passes all of the provided parameters (i.e., Content with Geolocation based Rules) to the APIE 218 which in turn validates all of the provided parameters. If a required parameter is omitted, or is provided incorrectly, or does not match, the APIE 218 generates one or more codes 508 and returns them to the calling application 502.

If the required parameters are valid, the Placed Content is added to APIE's associated database, as shown in FIG. 2 component 216, and the Content is available for Retrieval.

The Placement of Content and subsequent association of the Content to a Geolocation may create a Geo Place for Retrieval by User Device(s) which may be done in any manner, such as by accessing the APIE 218 via an App, browser or interface from any computing device.

For example, referring again to FIG. 2, a system 200 of the present invention allows one or more users and User Devices 202 to interact with the APIE 218 for Placement of Content to form Geo Places. Specifically, as Content is generated by Admin and User Devices 202, the APIE 218 may allow the user to access the APIE 218 as shown in FIG. 2, wherein the Content and associated Geo Places and associated Rules may be stored utilizing the Content Storage Module 212 on the Application Server 208. A UID that provides access to the Content may be generated by the APIE and may be passed to a User Device for further use thereof by the user, as described in more detail below.

Figure 6:
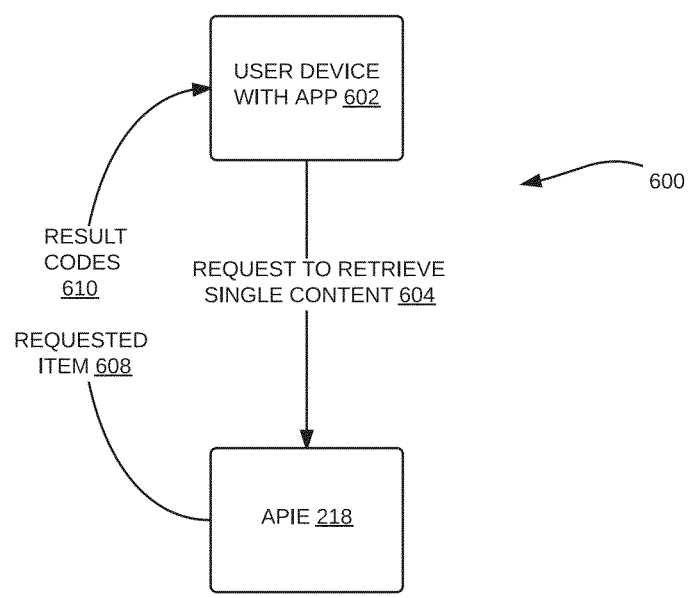
FIG. 6 illustrates a process of Retrieving Content.

Referring now to the invention in more detail, FIG. 6 illustrates a method 600 for allowing a User Device to Retrieve an individual Content defined as a Geo Place. Specifically, a User Device 602 has sent a "Retrieve Individual Content" call 604 to the APIE 218 into one or more of the user's own applications (i.e., third party applications). The APIE 218 then processes the request and returns Result Codes 610 indicating the result of the call.

Each call to the APIE 218 may specify the following parameters, not all which are required:
Registration UID 408—Obtained by registration via the process described in FIG. 4.
Content UID—The UID of the Content to Request.
User Device geolocation.

After receiving the Retrieve Individual Content call 604, the APIE 218 validates the provided parameters. If a required parameter is omitted, or is provided in incorrect format, or does not match (i.e., the provided Registration UID 408 must be matched in the APIE), the APIE 218 generates one or more codes and returns them to the calling application in the form of Result Codes 610.

If the required parameters are valid and the APIE UID matches, the APIE 218 attempts to return the requested Content or Geo Place via the Return Requested Content step 608 (including, for example, the title, description, and the actual Content—the text field or the physical file).

Specifically, when the User Device running the App 602 within the appropriate Retrieval Range or has crossed the Retrieval Range for Content (as described below), and all the needed Rules are satisfied, APIE 218 returns the Content via step 608 (the title, description and text field/file) via the Return Result Code(s) step 610, which will provide a URL associated with the Content for Retrieval. If the user who Placed the Content required a Retrieval notification, the APIE 218 sends a notification to the User Device of the user who Placed the Content. In processing the call, the APIE 218 increments tracking fields and other analytics metrics. In one embodiment, the number of Retrievals is incremented.

When the User Device running the App is not within the appropriate Geolocation to Retrieve the Geo Place or Geo Places with Retrieval Range for the Content, the APIE 218 returns a code stating that the device is out of range for that Content.

Figure 7:
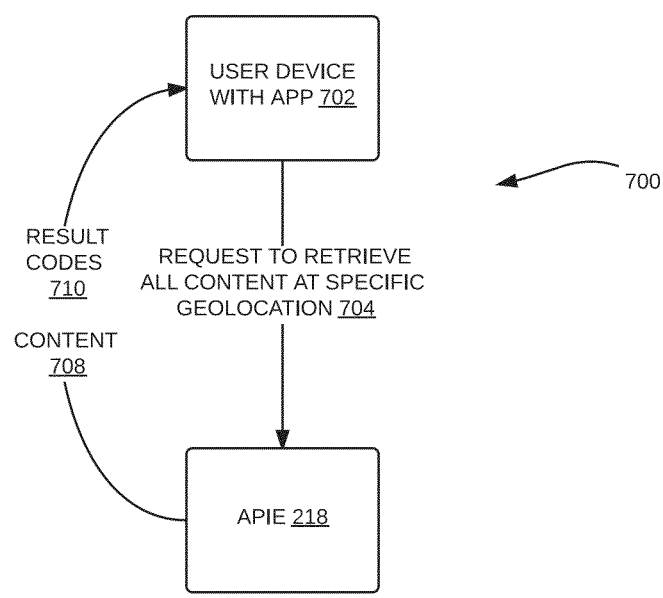
FIG. 7 illustrates a process of Retrieving all Content and information based on the User Device's satisfaction of Geolocations and Rules.

Referring now to the invention in more detail, FIG. 7 illustrates Content Retrieval Method 700 to a User Device with App 702. Specifically, the User Device 702, through the App, has a call to the APIE 218.

Thus, FIG. 7 illustrates a method 700 for allowing a User Device 702 to Retrieve all Contents which the User Device satisfies each of Content's Rules in part or whole including, for example, the User Device's Geolocation. Specifically, a User Device 702 calls the APIE 218 with a specific request for all Contents at a specific Geolocation via step 704. The APIE 218 then processes the request and returns Result Codes 710 indicating the result of the call. The parameters applicable to FIG. 6 may apply here as well.

After receiving the request 704, the APIE 218 validates the provided parameters. If a required parameter is omitted, or is provided in incorrect format, or does not match (i.e., the provided Registration UID must be matched in the APIE), the APIE 218 generates one or more codes and returns them to the calling application in the form of Result Codes 710.

If the required parameters are valid and the UID matches, the APIE 218 finds all Geo Places which the parameters satisfy the Rules for Geo Place and returns the Content to the User Device in the form of Contents 708 (including, for example, the titles, descriptions, and the Contents—the text field or the files).

Figure 8:
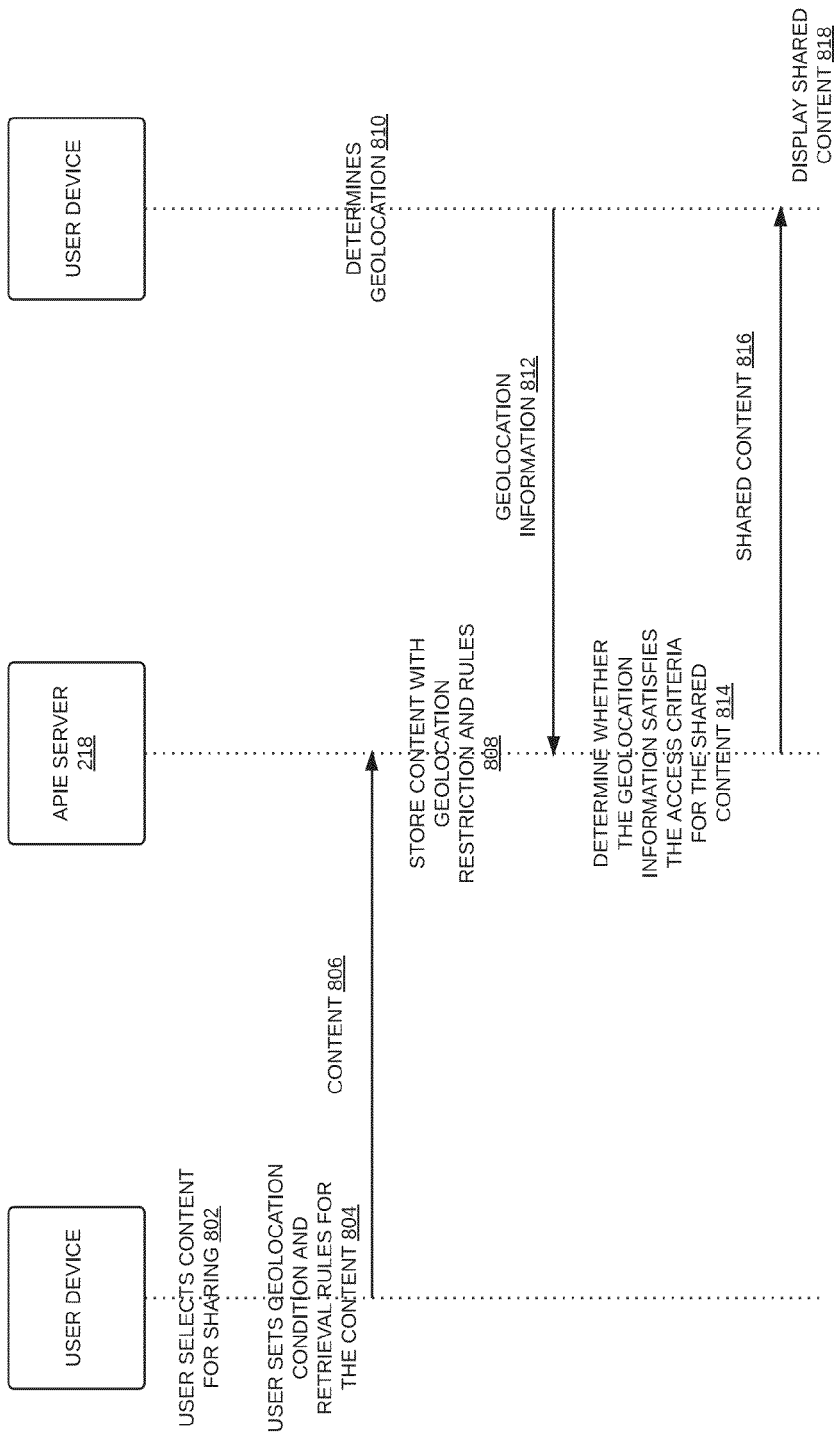
FIG. 8 illustrates a process of placing, Retrieving and feature activity for Content and/or information based on the App via User Device, Geo Place and Rules satisfied.

In an alternate representation of the present invention, FIG. 8 illustrates a method 800 illustrating Content Placement and Content Retrieval, in an embodiment of the present invention. Specifically, the App, via the User Device may generate Content, as described above. The Content may be selected by the App for sharing, notifying, inviting and/or communicating with others via the APIE 218 via step 802. The Geo Place may also be selected by the User Device via step 804, as well as any number of other Rules and parameters specified above with reference to FIG. 5. The Content 806 may then be shared via the APIE 218, where the Content 806 and associated Geo Place and Rules information, as well as other parameters, may be stored via step 808.

At another point according to the method described in FIG. 8, other User Devices may determine their Geolocation via step 810 using Location Services Module 104 (as illustrated in FIG. 1) and submit the device's Geolocation to the APIE Server 218 as Geolocation Information 812. The APIE Server 218 then processes this request and determines if the Geolocation Information 812 satisfies the access criteria for the shared Content 814. If so, the APIE Server 218 returns the shared Content 816 to the User Device to be displayed to the user via step 818.

Figure 9:
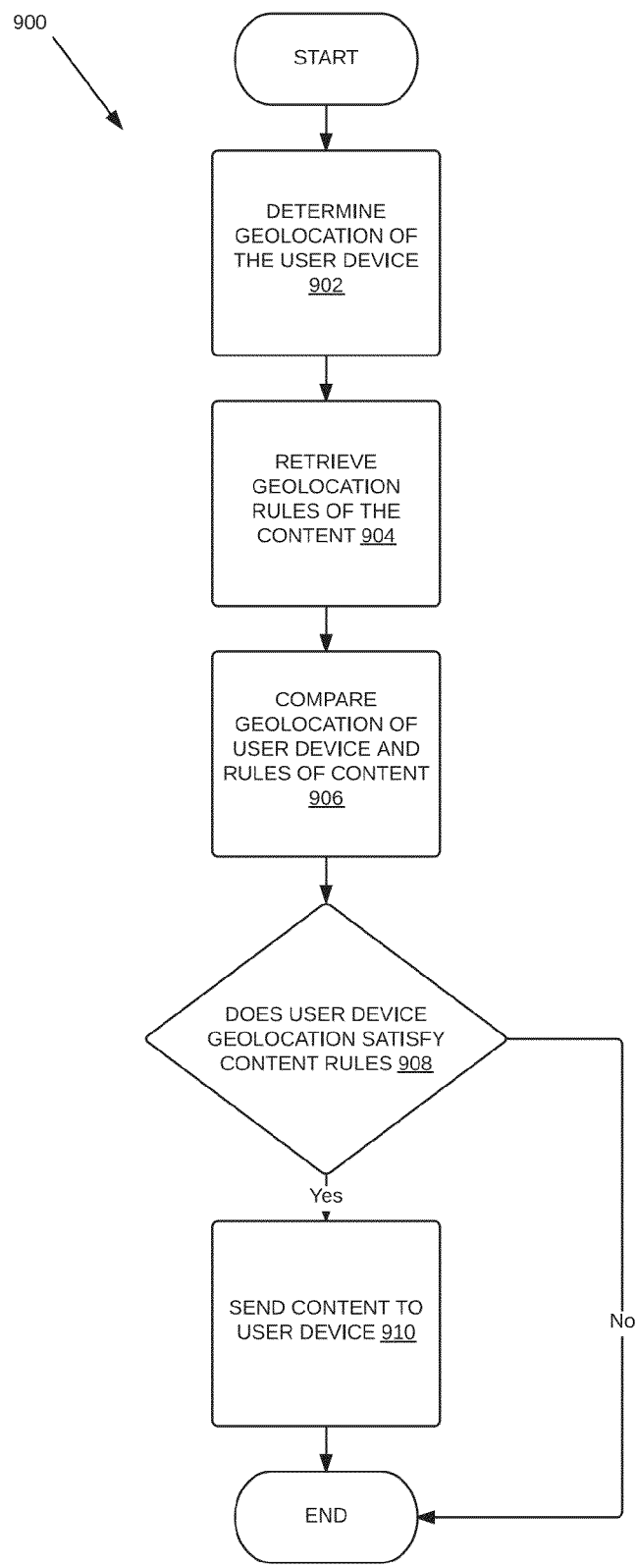
FIG. 9 is a flow diagram illustrating one example method for Retrieving a Content from a Geo Place.

Referring now to the invention in more detail, FIG. 9 illustrates, in an embodiment of the present invention, a method 900 for providing User Device access to the Content that has been Placed in a Geo Place. In a first step, the Geolocation of the User Device is performed via step 902 followed by Retrieval of the Geolocation Rules of the Content via step 904. The Geolocation of the User Device is compared to the Geolocation Rules of the Content via step 906. If the User Device Geolocation satisfies the Content Rules (as determined in step 908), the Content is sent to the User Device 910. If not, then the method 900 ends without Retrieval of the Content by the User Device.

In an embodiment, the Content may have an associated Retrieval Range. If the User Device running the App is within the Retrieval Range for Content, and other Content Rules are satisfied (such as, for example, the number of Retrieval times is less than any limit set by the user (in this case Content provider), and the date for the attempted Retrieval is after the provided available date and before the provided expiration date), the APIE Server 218 returns the Content in the App. If the user who Placed the Content required a Retrieval notification, the APIE 218 sends a call to App. The APIE 218 increments tracking fields for the number of Retrievals as well as the number of times the APIE 218 was called for the specific Content.

When the user Device is running the App within the appropriate Retrieval Range for the Content or when User Device has crossed a Retrieval Range, but does not satisfy other Rules (Rules are created by Admin and App and are short listed above), the APIE 218 shall not allow Retrieval of Content.

When the user Device running the App is not within the Retrieval Range for the Content or has not crossed the Retrieval Range for the Content, the APIE 218 will send a call for not satisfying the Geo Place Rules.

Figure 10:
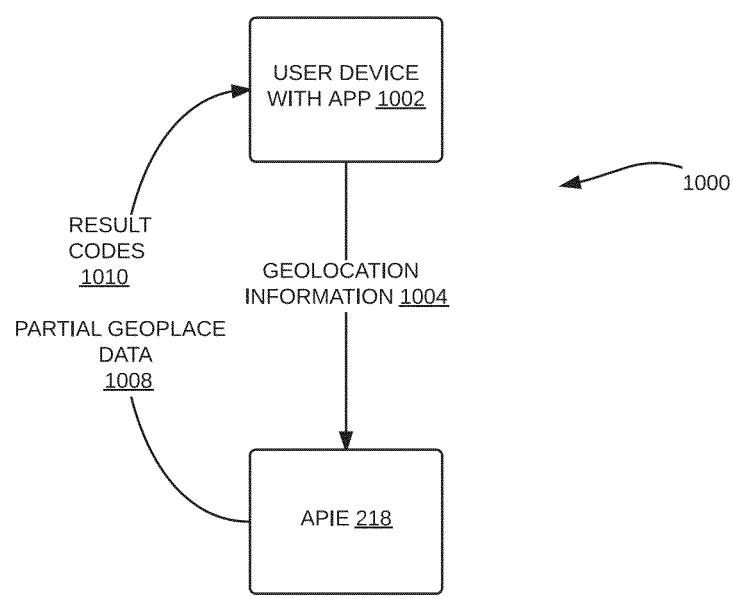
FIG. 10 is a flow diagram illustrating one example method for determining APIE parameters for Content Rules from a Geo Place, in part.

FIG. 10 illustrates a flow diagram of one example method 1000 for Retrieving partial Content information based on a User Device 1002 satisfying some but not all of a particular Content's Rules. In this example, a User Device 1002 makes a Retrieve Content call to the APIE 218 similar to FIG. 7, sending the User Device's Geolocation Information 1004. The APIE 218 processes the call and finds a particular Content's Rules are satisfied partially by the Geolocation Information 1004. The APIE 218 then returns the Partial Geo Place Data 1008 in accordance to the Retrieval Rules. In this embodiment, the Content item has various Rules for each element of data. For example, the Content may have a Retrieval Range that is different and/or independent of the Retrieval Range for Content's metadata (e.g. title, description, comments, etc.); which may be set by user, APIE and/or Admin. If a User Device does not satisfy all Retrieval Rules for Content, it can still satisfy some of the Retrieval Rules for Content.

As a result of this, a User Device may receive more information and/or metadata on a Geo Place based on how close the User Device is to the Geo Place. This will allow a user to get information and/or metadata for nearby Content that the User Device has not satisfied the Retrieval Range for, and can get more as the User Device gets closer.

Figure 11:
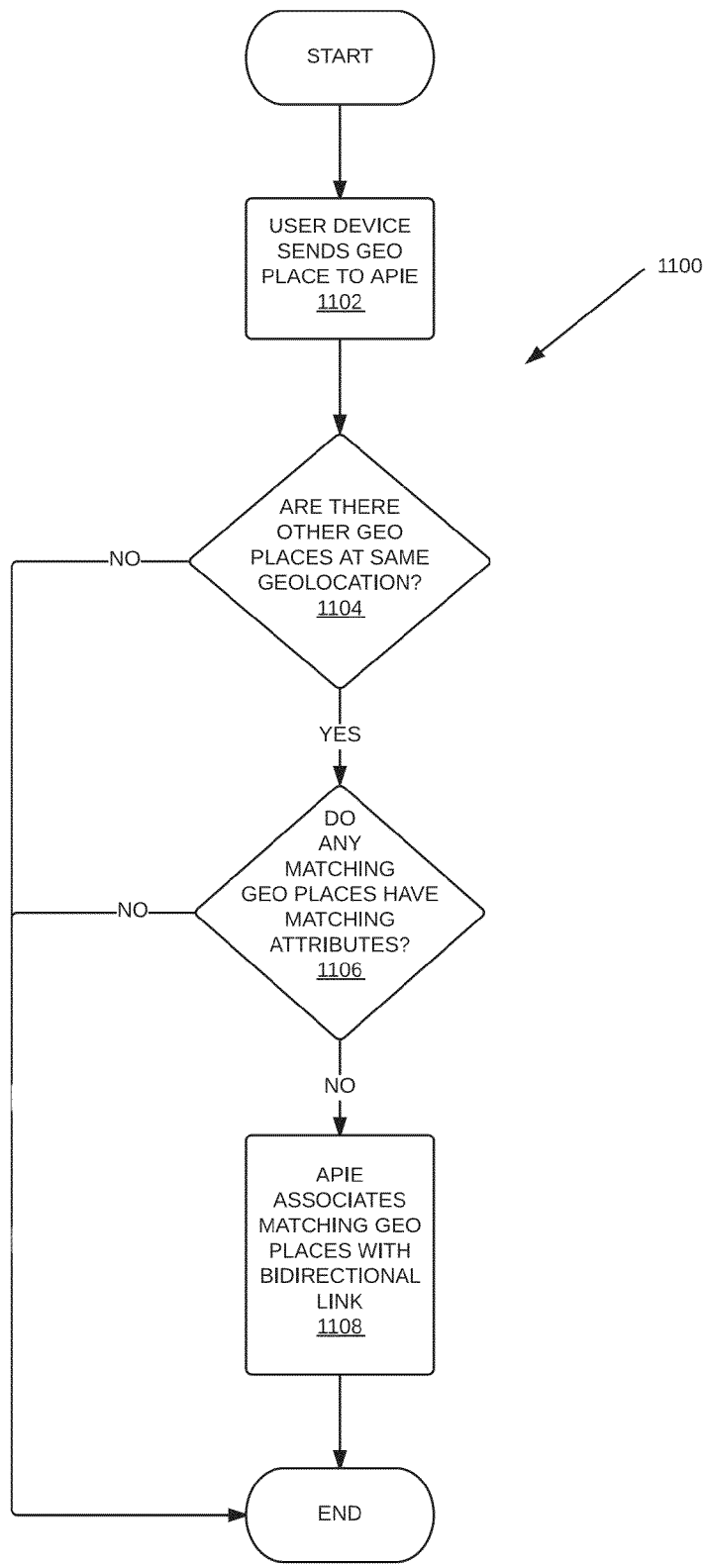
FIG. 11 is a flow diagram illustrating a process of associating Geo Places based on Rules and meta data.

FIG. 11 represents a process for associating Geo Places based on Rules and metadata 1100. At step 1102, a User Device 100 (as illustrated in FIG. 1) places a Geo Place in the form described in FIG. 5. Once the APIE 218 has received the request, the APIE processes the request and determines if there are any other Geo Places which based on Rules and metadata satisfy the conditions of association. The first step of association is determining if any other Geo Places exist at the same Geolocation, as illustrated in step 1104. This matching process takes into consideration Rules including, but not limited to, Retrieval Range. If an overlap exists between the Placed Geo Place in step 1102 and other Geo Places already stored, the APIE 218 determines if any of the attributes (e.g. metadata) match as illustrated by step 1106. For example, if the two Geo Places shared the same title, or were categorized as the same category of Content, the APIE 218 would then consider them a match and establish a bidirectional link between the Geo Places in the database as illustrated by step 1108. In one example of this functionality, Content can be associated to an Event and individual Geo Places. For example, consider if a user at a karate competition places a video of the competition as a Geo Place. If the Event itself (i.e., the karate competition) is in the APIE 218, a video of the competition would be associated to the Event representing the competition. As other users add more Content at the Event, the APIE associates all of them together and with the Event itself. In this way, Geo Places are naturally linked to related Geo Places and/or Events.

Figure 12:
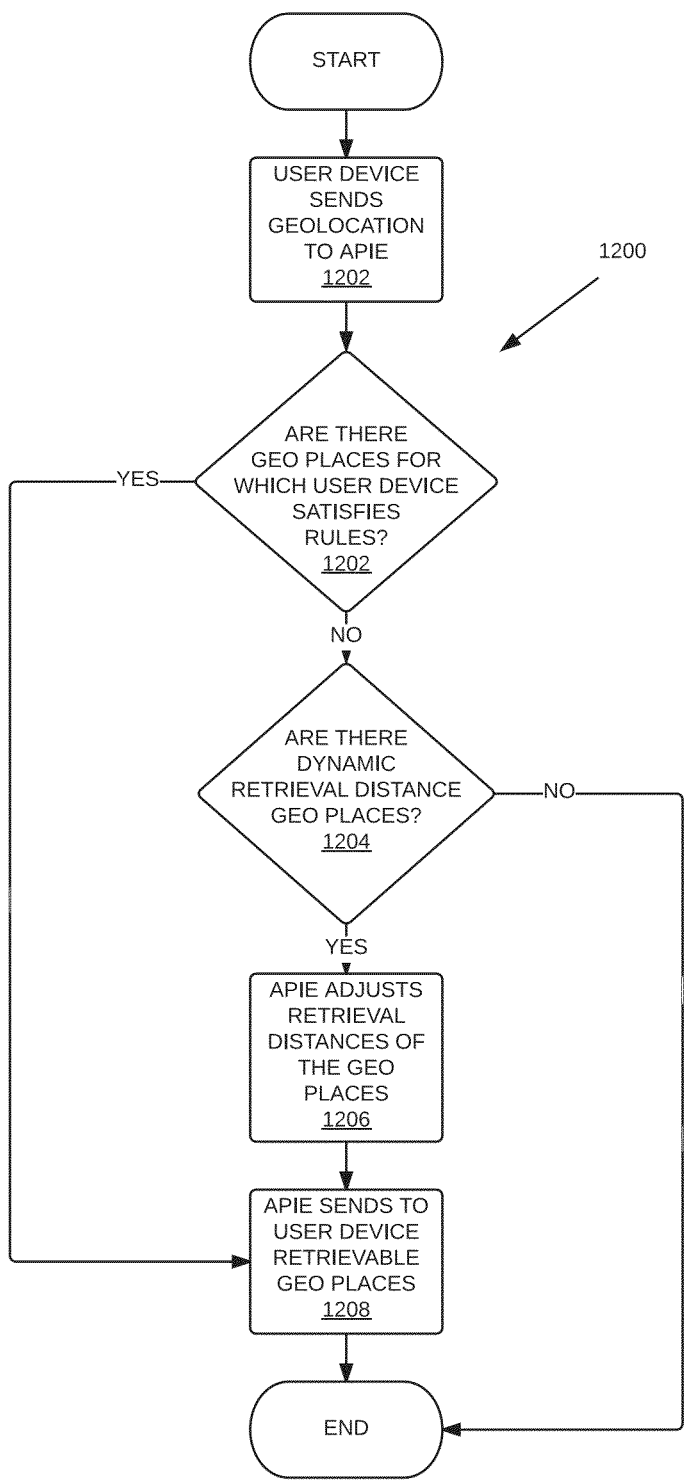
FIG. 12 is a flow diagram illustrating a process of dynamically updating Retrieval Rules based on App and User Device's environmental factors.

FIG. 12 represents a process of dynamically updating Retrieval Rules based on App and User Device's environmental factors. At step 1202, a User Device 100 (as illustrated in FIG. 1) sends its Geolocation to the APIE 218. This request is represented in FIG. 7 by step 704. Once the APIE 218 receives the request, the APIE searches for Geo Places with its Retrieval Rules which are satisfied by the User Device. If there are Geo Places for which the User Device's satisfies the Retrieval Rules, the APIE simply returns the matching Geo Places' Content.

If there are no matching Geo Places, the APIE performs a second search for Geo Places which support dynamic Retrieval Ranges, as illustrated by step 1204. Dynamic Retrieval Range allows the APIE to expand the predefined Retrieval Ranges for Geo Places in the circumstance that no other Content is near the User Device. This is particularly useful in large open environments, such as mountains, forests, and deserts. If no Geo Places satisfy this criterion, the process is over. If there are Geo Places with dynamic Retrieval Ranges, the APIE will adjust the Retrieval Range to encompass the User Device's position, thus satisfying the Retrieval Threshold of a Geo Place, as illustrated in step 1206. The APIE then sends the Content to the User Device as illustrated in step 1208. The dynamic Retrieval Range allowances may be set by user, APIE and/or Admin.

Figure 13:
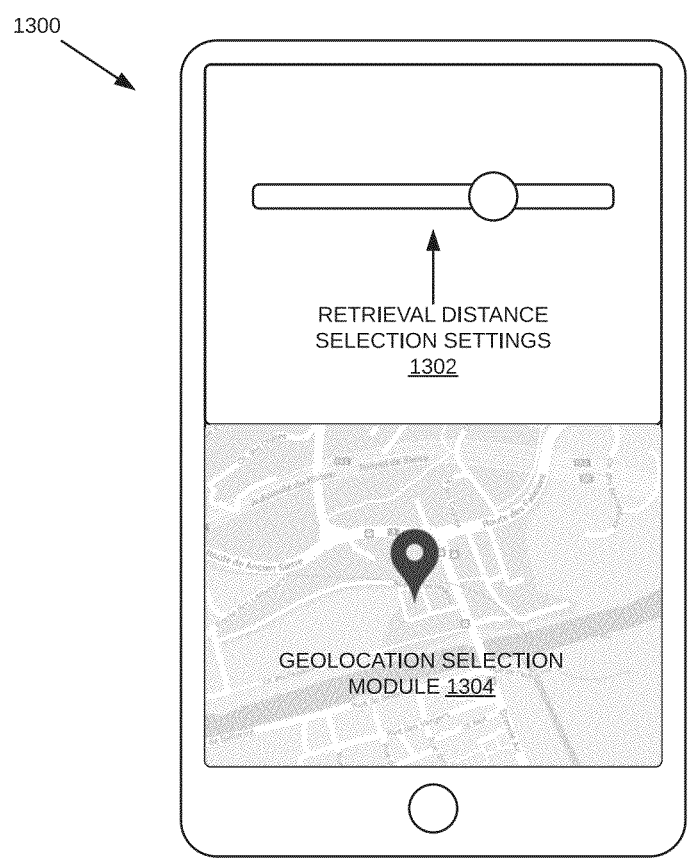
FIG. 13 is an example GUI of an App or API on a User Device for modifying the Retrieval distance of a Content.

FIG. 13 is an example of a graphical user interface (GUI) of an App's or API's interface on a User Device for modifying the Retrieval Range of a Content 1300. In this example embodiment, a User Device allows a user to select the Retrieval Range of a particular Geo Place by utilizing a slider 1302. In this way, different Geo Places can have various Retrieval Ranges. One example of this functionality is to allow Content to have larger and smaller audiences. For example, a restaurant off the beaten path may want a relatively large Retrieval Range for their Content, to allow people far away to discover their Content. In another example, a scavenger hunt organizer may want a very small Retrieval Range for their Content, to make it more difficult for scavenger hunt participants to discover the Content.

Figure 14:
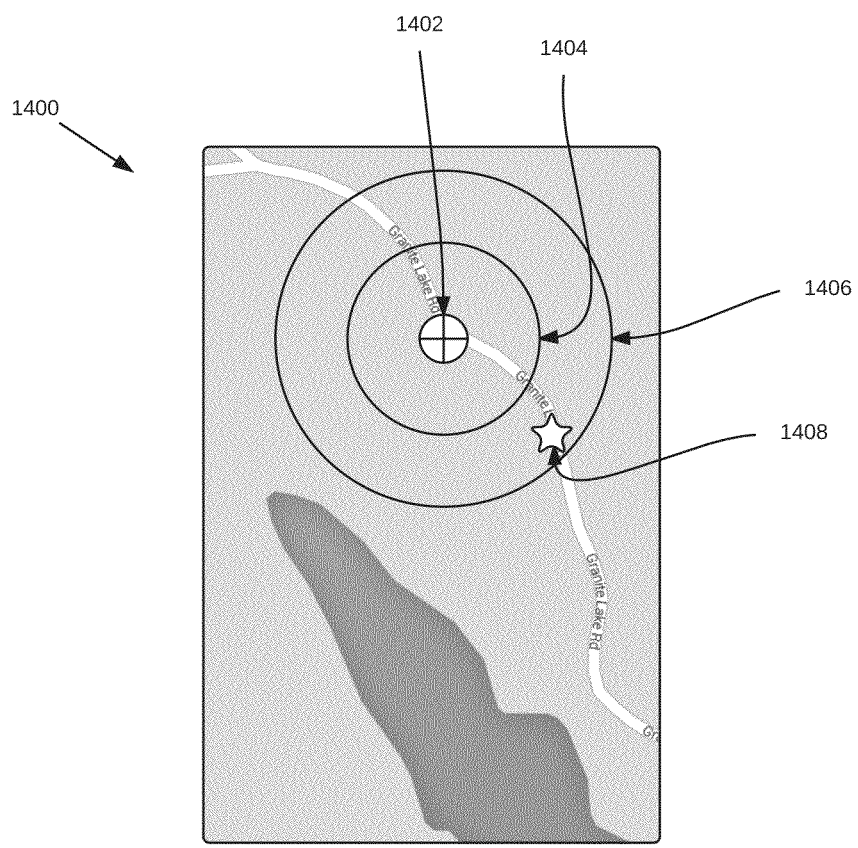
FIG. 14 is an example GUI of an App or API on a User Device showing dynamic Retrieval Rules based on App and User Device's environmental factors.

Referring now to FIG. 14, which is an illustration 1400 to visually present how more Retrievable Content may be available if no Content or not enough Content is available to a User Device 1408 when such User Device 1408 may be out of the Retrieval Range 1404. This illustration is an example of the process in FIG. 12 of dynamic Retrieval Ranges. This will allow the user to see more Content 1402 around them based on what is currently nearby to the User Device 1408. For the example, User Device 1408 will be able to use the Content 1402 even though User Device is outside Retrieval Range 1404 in this instance. Specifically, the User Device 1408 may be outside the normal Retrieval Range 1404 of the Content 1402. By following the method of FIG. 12, the APIE analyzes whether there are Geo Places nearby that have dynamic Retrieval Ranges (step 1204). If so, the APIE adjusts the Retrieval Range 1406 of the Content 1402 via step 1206 and then sends to the User Device, via step 1208, the now-discoverable and Retrievable Content 1402.

Figure 15:
FIG. 15 is an example GUI of an App or API on a User Device being viewed by a user, to select a Geolocation.

Referring to FIG. 15, for when a user Places Content using the App module 1500, the Geolocation Selection Module 1504 shall gather the Geolocation from User Device to create a Geo Place via Geo Place Selection Module 1502. The selection of the Geolocation can be automatic based on the User Device's Geolocation information or the user can move the Placement of the Content to a different area via Geolocation Selection Module 1504 to create a Geo Place. When a user chooses to Place the Content in a different area, the user shall have a placement range that is acceptable to Place within, and this range is processed by the App module 1500 and Geolocation, due to the parameters set by the APIE 218 and/or Admin and communicated to App.

Figure 16:
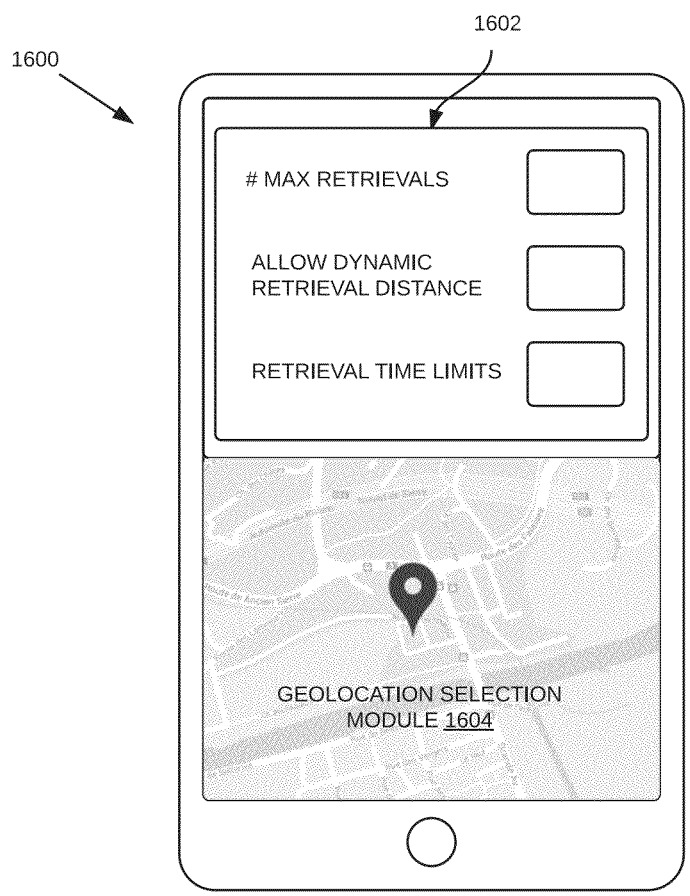
FIG. 16 is an example GUI of an App or API on a User Device for setting the Retrieval Rules of Content.

FIG. 16 is an example of a screen for App module 1600 for a user to input Rules 1602 for Content at a Geo Place to make Retrieval Rules. In this example user would select the maximum number of Retrievals, Retrieval distance from Geo Place (aka Retrieval Range) and/or whether dynamic Retrieval Range is desired, and Retrieval time limits. Retrieval time limits may typically have a start date and time and may have an expiration date and time. This example is a short list of potential Rules a user providing Content may apply to a Geo Place, and it should be noted that other Rules may be provided to a user for providing Retrievable Content to a Geo Place.

Figure 17:
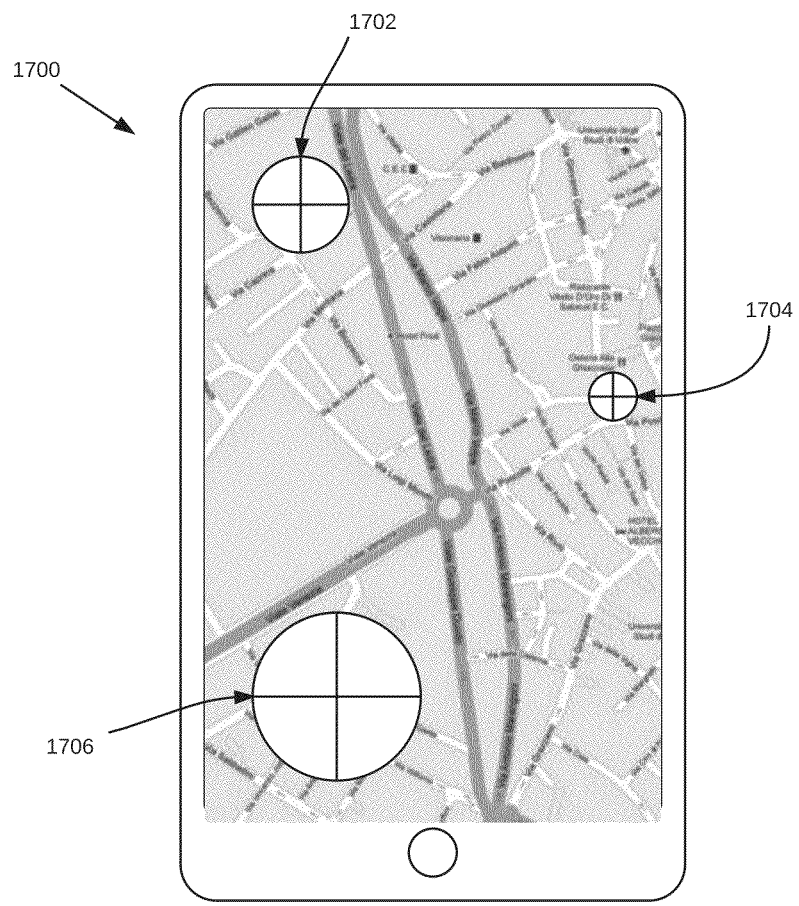
FIG. 17 is an example GUI of an App or API on a User Device for viewing Content in a map view with their respectful Geo Places and Retrieval Ranges.

FIG. 17 illustrates an example GUI of an App or API on a User Device for viewing Content in a map view with a plurality of Geo Places and their associated Retrieval Ranges 1700. In this example embodiment, a User Device shows a map with Geo Places overlaid and Placed at their respectful Geolocations. The size of the circle indicates the range size of the Retrieval Range and shows what area a User Device must be in to satisfy the Geo Place's Rule for Retrieval Range. Item 1704 is a Geo Place with a relatively small Retrieval Range.

Item 1702 is a Geo Place with a relatively medium Retrieval Range. Item 1706 is a Geo Place with a relatively large Retrieval Range.

Figure 18:
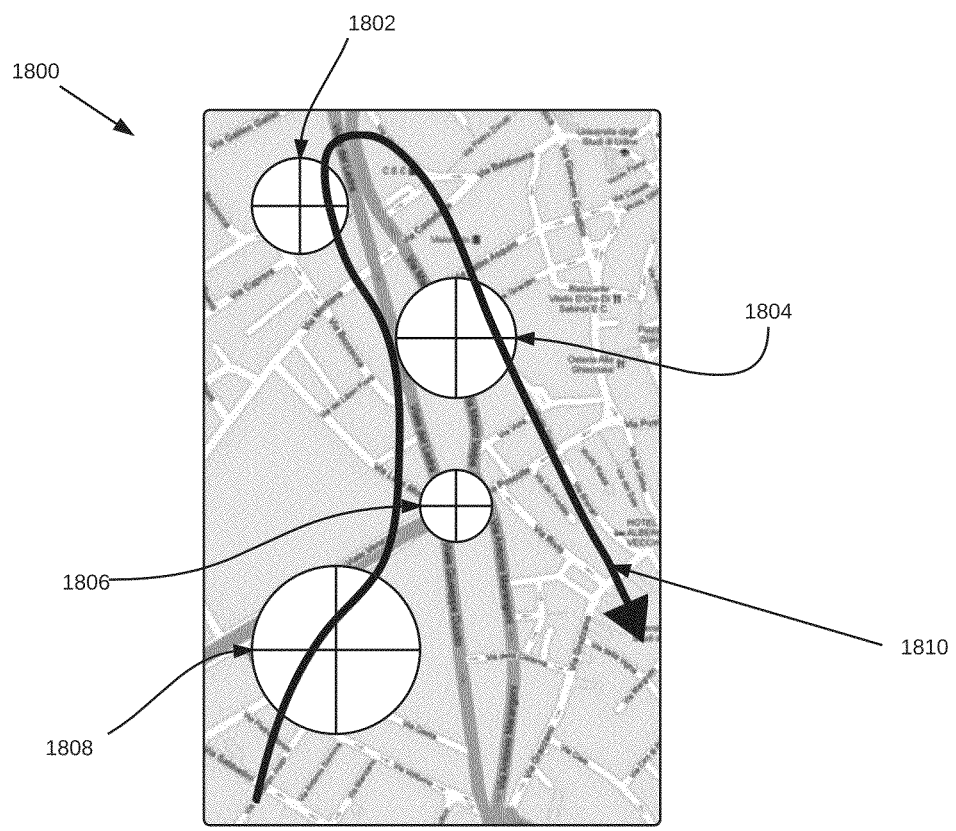
FIG. 18 is an example of visualization of a user's path for Content Retrieved by User Devices.

Referring to FIG. 18, which is an illustration 1800 to visually present a user's path 1810, and what Content may be available to user's User Library on the user's User Device. For an example 1808 represents a Geo Place, Retrieval Range and Retrieval Rules for Content; in this example the User Device must cross through the Retrieval Range (and otherwise satisfy the Retrieval Rules) of this Geo Place and use the Content within this Retrieval Range for user to have rights to it in the User Device's User Library. Also for an example 1802 may represent a second Geo Place, Retrieval Range and Retrieval Rules for Content; in this example the User Device must cross through the Retrieval Range (and otherwise satisfy the Retrieval Rules) of this Geo Place and use the Content within this Retrieval Range, for user to have rights to it in the User Library of the User Device. Also for an example 1804 may represent a third Geo Place, Retrieval Range and Retrieval Rules for Content; in this example the User Device must cross through the Retrieval Range (and other satisfy the Retrieval Rules) of this Geo Place to access the Content, but may be granted access to use the Content outside this Retrieval Range, for user to have rights to it in the User Library of the User Device. In this set of examples, if user did not use the User Device and App to access the Content in the Retrieval Ranges of 1802, 1804 and 1808, then user could only have Content 1804 if user has satisfied all other Rules for Content 1804 for use by user's User Library. With this path 1810 of user, the User Device may receive notification of Content missed for 1802, 1806 and 1808. The notification may notify user based on what Content was missed and how the user missed the Content and providing usage hints so that user may Retrieve and utilize use more Content. In this same set of examples of user path 1810 the user may further receive notifications of missed nearby Content. For example, Content 1806 may have an associated Retrieval Range, which was missed by the User Device as the user followed path 1810. However, because the Content was relatively close, the User Device may still receive notifications of missed nearby Content 1806, even though the User Device did not cross through the Retrieval Range of Content 1806. Notifications can be further shown in FIG. 19.

Figure 19:
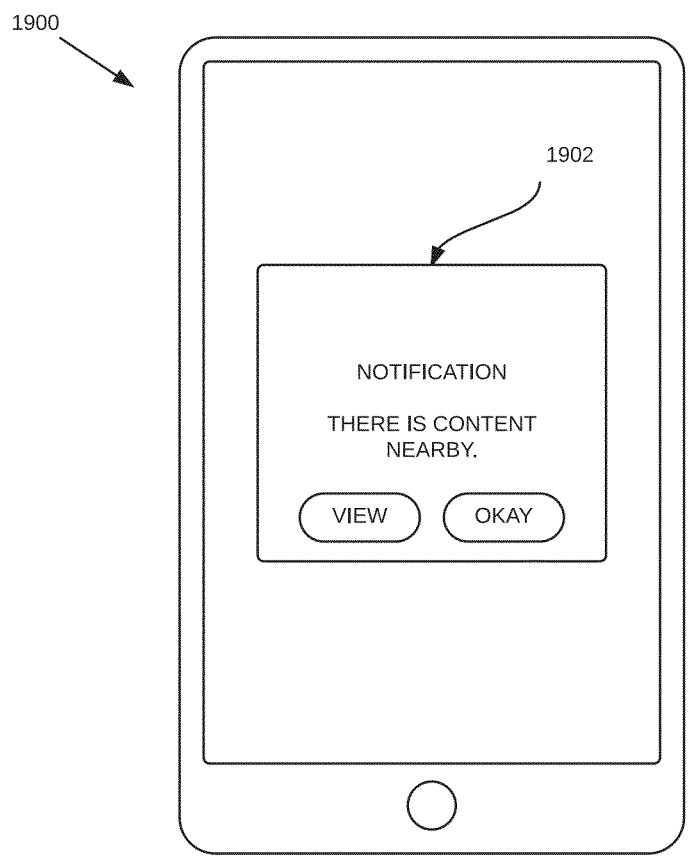
FIG. 19 is an example GUI of an App or API on a User Device for notifications to users via Apps and User Devices.

FIG. 19 is an example GUI of an App or API on a User Device for notifications to users via Apps and User Devices 1900. In this example, a User Device 100 receives a notification 1902 from the APIE 218 informing the user there is Content nearby their Geolocation. Notifications are not limited to nearby Content. For Example, notifications can also inform users of activity related to their own Content such as Retrievals, comments, and other actions by other Users, APIE or Admin.

Figure 20:
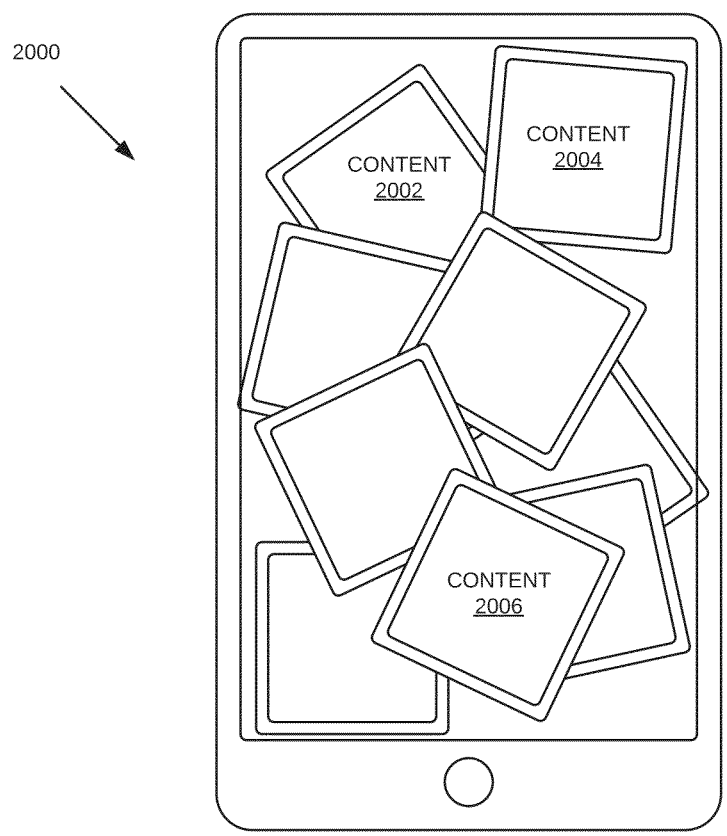
FIG. 20 is an example GUI of an App or API on a User Device for finding, viewing, reviewing and sifting through Content.

FIG. 20 illustrates an example GUI on a User Device for finding, viewing, reviewing and sifting through Content, such as Content accessible in the user's User Library. In this example GUI, a User can move and sift through the Content, much like they could if the Content were physically in front of them and they were sorting through a pile by use of their hands. In this example, Content 2002 may be near the bottom of the pile and is obscured from view by other Content, such as Content 2004. A user can select it to bring it to the top, or select it and push it off the edges of the screen to dismiss the item, or sifting through top Content to get to Content 2002; or other actions such as store for later, favorite, or share. Content 2004 is likewise near the bottom of the pile, but is on top of 2002. Content 2006 is at the top of the pile, and its view is not obscured by any other Content and thereby the user may have quicker access for use of Content.

Figure 21:
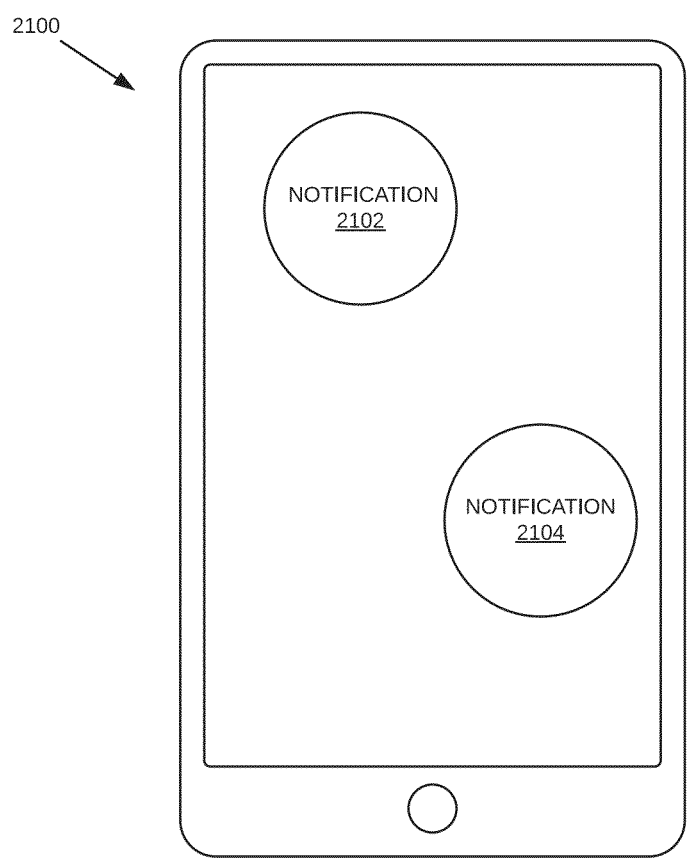
FIG. 21 is an example GUI of an App or API on a User Device for following, viewing, reviewing and selecting Content based on movement and notification via Geolocation and Geo Places.

FIG. 21 is an example of a screen for App module 2100 which the App may display images for Content 2102 and/or Content 2104 that may be nearby User Device. For example notification 2102 User Device may be within Retrieval Range and notification 2104 may be for Content nearby. In this example if user satisfies all Retrieval Rules needed for Content that notification 2102 dynamically notified user for, then user may Retrieve and use the Content notified. In this same example User Device must move to Retrieval Range for Content that user was notified by notification 2104 to be able to satisfy Retrieval Rules for such Content. This example of a screen and the mentioned examples are presented to explain a method for App to notify users of Retrieval Ranges and Content that User Devices are within or nearby, so that user can easily and actively use Content without extra actions, as applicable.

This FIG. 21 is also to demonstrate a method to randomly and/or dynamically notify users based on Geolocation, user's activities, users' activities, nearby activities, Admin and/or APIE to enhance and/or gamify user's experience.

Figure 22:
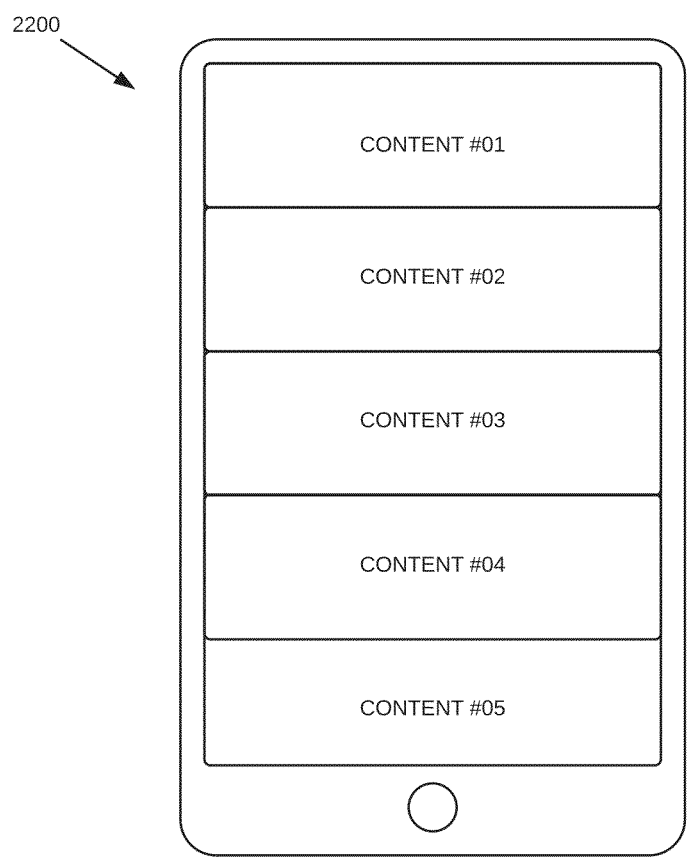
FIG. 22 is an example GUI of an App or API on a User Device for viewing all Content which User Devices have satisfied the Retrieval Rules to access Content via User's Library via App.

FIG. 22 illustrates one example GUI of an Apps interface on a User Device for viewing a User Library of Content. In this example, the Content listed is only the Content which the User Device has satisfied the Retrieval Rules for. For example, if a User Device's Geolocation satisfies all Retrieval Rules of a particular piece of Content, that Content may then be part of the User's Library. If the User Device's Geolocation changes and it no longer satisfies the Retrieval Rules of the Content, the Content may still be available in the user's User Library so long as the Content allows for storage in User Library. Referring back to FIG. 19, assuming 1802, 1804, 1806, and 1808 all allow for User Library storage, the User Path 1810 would satisfy the Retrieval Rules of 1802, 1804, and 1808 (assuming all associated Retrieval Rules required are otherwise satisfied and these items would be available in the user's User Library. Content 1806 is not satisfied, and therefore is not available in the user's User Library. Thus the systems and methods of the present invention may limit whether Content is accessible and Retrievable only when a User Device is within the Retrieval Range and otherwise satisfies the required Retrieval Rules, or whether Content is accessible and available to users after a user leaves the Retrieval Range and/or otherwise no longer satisfies the Retrieval Rules on a user's User Library.

The systems and methods of the present invention may have other features known as "social networking" functionality, including but not limited to the following. Specifically, an App may include a "chat" feature that allows users the ability to chat with other users, Admin the APIE and/or outside parties as they are using the App or third party interfaces. An "invite" feature may be included that may allow a user to invite others to a particular Geo Place, Geolocation or Event, which may include many Geo Places that form, in effect, a "Geo Fence", to utilize Content during an open or a specified time period. The invited users may be able to accept, maybe, deny, visit on their own, or propose another time to meet.

Additionally, a "popularity" feature may be included that allows a user to follow and to provide information on the activity of another user, Content, Geo Place, Event or general Geolocation. Once the user is provided the rights to follow, the user may be notified of changes and/or interact therewith. Moreover, the user may be given a "thumbs up" or "thumbs down" feature that allows the user to rate Content, Geo Place, Event, or other portions thereof.

In addition, a "sharing" feature may be included that allows a user to share Content, Geo Place, Event, notification, or another aspect of the system disclosed herein.

The user may further be provided with the ability to easily generate Content, such as by providing the user, via the App, with Instant Video, Instant Picture (or Photo), Instant, Audio, or other Content generating features (such as URL capture, screen capture, or the like).

In addition, a user may be provided the ability to define or create an Event, where a plurality of Geo Places may be defined and associated therewith. The user may further be provided the ability to create an Event without physically being present in a particular Geolocation, and further the user may have the ability to control the Event created, such as providing specific Rules for Placement of Geo Places and other like control features.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

We claim:

1. A system for placing and retrieving digital media content at a geographic location comprising:
    a server comprising an application interface engine and a storage module, the application interface engine configured to communicate with a computing device, wherein the computing device is configured to upload the digital content file to the storage module of the server and further configured to define a first access rule and a second access rule for the digital content file, wherein said first access rule and said second access rule are communicated to the application interface engine and stored in the storage module, and further wherein said first access rule comprises a geographic location and an access area proximal to the geographic location, and said second access rule is selected from the group consisting of a sharing rule requiring sharing of the digital content file when retrieved by the portable computing device, a maximum retrieval rule wherein the maximum retrieval rule specifies the number of times the digital content file is retrievable from the application interface engine wherein the application interface engine is configured to prevent retrieval of the digital content file by the second computing device if the digital content file has been retrieved the specified number of times, and a dynamic retrieval threshold rule wherein the dynamic threshold rule expands the access area proximal to the geographic location; and
    a portable computing device comprising a location detection module and a storage module, and further configured to communicate with the application interface engine, said portable computing device configured to receive the digital content file when the portable computing device is within the access area proximal to the geographic location.

2. The system of claim 1 wherein the location detection module is selected from a global positioning system sensor, a Bluetooth sensor, and a cellular tower triangulation sensor.

3. The system of claim 1 wherein the digital content file is selected from the group consisting of an audio file, a video file, a picture file, text file and an interactive application file.

4. The system of claim 1 wherein the computing device comprises a digital content generation module, and the computing device is configured to generate the digital content file with the digital content generation module.

5. The system of claim 1 wherein the computing device is further configured to define a third access rule, wherein said third access rule is communicated to the application interface engine and stored in the storage module at the server.

6. The system of claim 5 wherein the third access rule is selected from the group consisting of an availability date, an expiration date, and a privacy rule.

7. The system of claim 1 wherein the digital content file is stored in the storage module of the portable computing device after retrieval from the application interface engine.

8. The system of claim 7 wherein the digital content file is accessible from the storage module of the portable computing device after the portable computing device exits the access area proximal the geographic location.

9. The system of claim 1 wherein the digital content file comprises an access rule defining that the digital content file is accessible at the portable computing device only when the portable computing device is within the access area proximal to the geographic location.

10. The system of claim 1 wherein the portable computing device is configured to receive a notification from the application interface engine when the portable computing device is proximal to the access area but not within the access area.

11. The system of claim 1 wherein the portable computing device comprises a graphical user interface, and further wherein the portable computing device is configured to receive a plurality of digital content files from the application interface engine, wherein the graphical user interface shows the plurality of digital content files on the graphical user interface.

12. The system of claim 1 wherein the portable computing device comprises a graphical map interface, and further wherein the geographic location and the access area is defined for the digital content file using the graphical map interface.

13. The system of claim 1 wherein the computing device is further configured to define an event having a defined plurality of geographic location areas and an access area proximal the geographic location of the event, wherein the event is configured to be associated with a plurality of digital content files, wherein the portable computing device is configured to receive at least one of the plurality of digital content files associated with the event when the portable computing device enters the access area proximal the geographic location of the event.

14. A method using the system of claim 1 comprising the steps of:
    entering the access area with the portable computing device;
    determining the geographic location of the portable computing device using the location detection module within the portable computing device;
    sending a communication from the portable computing device to the application interface engine, wherein the communication indicates that the portable computing device is within the access area proximal the geographic location; and
    sending the digital content file from the application interface engine to the portable computing device.

15. The method of claim 14 wherein the digital content file is configured to be accessible by the portable computing device only when the portable computing device is in communication with the application interface engine but not storable on the portable computing device.

16. The method of claim 14 wherein the digital content file is inaccessible on the portable computing device when the portable computing device exits the access area.

17. The method of claim 14 further comprising the step of:
inviting at least one user to the geographic location.

18. A system for placing and retrieving digital content media at a geographic location comprising:
an application interface engine stored on a server in electronic communication with a storage module, the application interface engine configured to communicate with a first computing device, wherein the application interface engine is further configured to receive a digital content file from the first computing device and store the digital content file within the storage module, wherein the application interface engine is further configured to receive and store a first user access rule, wherein the first user access rule comprises a geographic location and an access area proximal to the geographic location, and further wherein the application interface engine is configured to receive and store a second user access rule selected from the group consisting of a sharing rule requiring sharing of the digital content file when retrieved by the portable computing device, a maximum retrieval rule wherein the maximum retrieval rule specifies the number of times the digital content file is retrievable from the application interface engine wherein the application interface engine is configured to prevent retrieval of the digital content file by the second computing device if the digital content file has been retrieved the specified number of times, and a dynamic retrieval threshold rule wherein the dynamic threshold rule expands the access area proximal to the geographic location, and
further wherein the application interface engine is further configured to receive geographic location information of a second computing device wherein the application interface engine is configured to send the digital content file to the second computing device when the geographic location information of the second computing device is within the access area proximal to the geographic location of the digital content file.

19. The system of claim 18 wherein the application interface engine is further configured to receive and store a third user access rule, wherein the third user access rule is selected from the group consisting of: an availability date, an expiration date, and a privacy rule.

20. The system of claim 18 wherein the digital content file comprises an access rule defining that the digital content file is accessible by the second computing device only when the portable computing device is within the access area proximal to the geographic location.

21. The system of claim 18 wherein the application interface engine is configured to send a notification to the second computing device when the second computing device is proximal the access area but not within the access area.

22. The system of claim 18 wherein the application interface engine is further configured to receive information concerning an event from the first computing device, wherein the information concerning the event includes geographic location information of the event and an access area proximal the geographic location of the event, wherein the event is configured to be associated with a plurality of digital content files, wherein the application interface engine is configured to send to the second computing device at least one of the plurality of digital content files associated with the event when the second computing device enters the access area proximal the geographic location of the event.

23. The system of claim 22 wherein the application interface engine is configured to send all of the plurality of digital content files to the second computing device when the second computing device enters the access area proximal the geographic location of the event.

24. The system of claim 18 wherein the storage module is configured to store a plurality of digital content files, wherein the first digital content file is sent to the second computing device when the second computing device is a first defined distance from the geographic location, and further wherein a second digital content file is sent to the second computing device when the second computing device is a second defined distance from the geographic location.

25. A system for placing and retrieving digital content media at a geographic location comprising:
an application interface engine stored on a server in electronic communication with a storage module, the application interface engine configured to communicate with a first computing device, wherein the application interface engine is further configured to receive a plurality of digital content files from the first computing device and store the digital content files within the storage module, wherein the application interface engine is further configured to receive and store a first user access rule, wherein the first user access rule comprises a geographic location and an access area proximal to the geographic location, and further wherein the application interface engine is further configured to receive geographic location information of a second computing device wherein the application interface engine is configured to send a first digital content file to the second computing device when the second computing device is a first defined distance from the geographic location, and further wherein the application interface engine is configured to send a second digital content file to the second computing device when the second computing device is a second defined distance from the geographic location.

26. The system of claim 25 wherein the application interface engine is further configured to receive and store a second user access rule, wherein the second user access rule is selected from the group consisting of: an availability date, an expiration date, a privacy rule, a sharing rule, a maximum retrieval rule, and a dynamic retrieval threshold rule, wherein the dynamic threshold rule expands the access area proximal to the geographic location and the maximum retrieval rule specifies the number of times the digital content file may be retrieved from the application interface engine, and further wherein application interface engine is configured to prevent retrieval of the digital content file by the second computing device if the digital content file has been retrieved the specified number of times.

27. The system of claim 25 wherein the digital content file comprises an access rule defining that the digital content file is accessible by the second computing device only when the portable computing device is within the access area proximal to the geographic location.

28. The system of claim 25 wherein the application interface engine is configured to send a notification to the second computing device when the second computing device is proximal the access area but not within the access area.

29. The system of claim 25 wherein the application interface engine is further configured to receive information concerning an event from the first computing device, wherein the information concerning the event includes geographic location information of the event and an access area proximal the geographic location of the event, wherein the event is configured to be associated with a plurality of digital content files, wherein the application interface engine is configured to send to the second computing device at least one of the plurality of digital content files associated with the event when the second computing device enters the access area proximal the geographic location of the event.

30. The system of claim 29 wherein the application interface engine is configured to send all of the plurality of digital content files to the second computing device when the second computing device enters the access area proximal the geographic location of the event.

* * * * *